United States Patent [19]

Franks et al.

[11] Patent Number: 4,912,999

[45] Date of Patent: Apr. 3, 1990

[54] SYSTEM FOR PIVOTABLY SUPPORTING AND TRANSMITTING POWER THROUGH A HELICOPTER TRANSMISSION AND ROTOR

[75] Inventors: Robert S. Franks, Laurel Springs, N.J.; Vincent J. Perillo, Havertown, Pa.

[73] Assignee: The Boeing Company, Seattle, Wash.

[21] Appl. No.: 103,003

[22] Filed: Sep. 30, 1987

[51] Int. Cl.$^4$ .............................................. B64C 27/06
[52] U.S. Cl. .................................... 74/417; 244/17.25
[58] Field of Search ................. 74/417; 248/661, 184; 224/66, 17.21, 17.25, 17.27, 51; 416/102, 148, 170 R, 170 A

[56] References Cited

U.S. PATENT DOCUMENTS

| | | | |
|---|---|---|---|
| 1,325,702 | 12/1919 | Schelb | 244/66 X |
| 2,589,030 | 3/1952 | Alde | 244/17.25 X |
| 2,761,521 | 9/1956 | Pullin | 244/17.25 X |
| 2,992,563 | 7/1961 | Lassen | 416/102 |
| 3,463,029 | 8/1969 | Chow | 74/417 |
| 3,514,054 | 5/1970 | Mard et al. | 244/17.27 |
| 3,921,939 | 11/1975 | Garfinkle | 244/17.25 |
| 4,358,243 | 11/1982 | Heath | 74/417 X |
| 4,499,790 | 2/1985 | Helms | 74/417 X |
| 4,720,059 | 1/1988 | Stearns, Jr. | 244/17.25 X |

FOREIGN PATENT DOCUMENTS

| | | | |
|---|---|---|---|
| 519794 | 4/1940 | United Kingdom | 244/66 |
| 662752 | 12/1951 | United Kingdom | 416/148 |

Primary Examiner—Peter A. Aschenbrenner
Attorney, Agent, or Firm—Jones, Tullar & Cooper

[57] ABSTRACT

The transmission, rotor and upper controls of a helicopter are supported on a roll housing mounted for pivotal rotation about the roll axis and on a pitch housing carried on the roll housing for pivotal rotation about the pitch axis. The roll housing carries a lower ring gear which meshes with an input shaft driven by an engine. The pitch housing carries side pinions, which mesh with the lower ring gear, and an upper ring gear, which meshes with the side pinions. A planetary gearset located in the upper transmissions cover includes a sun gear carried on the upper ring gear, a planet pinion carrier driveably connected to an output shaft, a set of planet pinions meshing with the sun gear and a stationary ring gear meshing with the planet pinions. The output shaft drives the rotor, rotor blades and rotating controls. Dampers restrain pivotal movement of the roll housing and pitch housing and pitch housing with respect to the fuselage.

25 Claims, 4 Drawing Sheets

SYSTEM FOR PIVOTABLY SUPPORTING AND TRANSMITTING POWER THROUGH A HELICOPTER TRANSMISSION AND ROTOR

BACKGROUND OF THE INVENTION

1. Field of the Invention

This invention relates to the field of power transmission systems for helicopters, and more particularly pertains to such systems supported on an airframe to permit pivotal rotation of the transmission, rotor and rotor controls about the roll and pitch axes, or any mutually perpendicular axes that intersect the yaw axes.

2. Description of the Prior Art

In conventional helicopters, as the forward speed of the aircraft increases, the disc plane is tilted so that the forward component of the rotor lift vector is directed in the direction of flight. Current rotor control systems include rotor blade cyclic pitch control, which cause the blades to flap cyclically as they rotate about the axes of the rotor. This cyclic flapping produces large dynamic loads, which adversely effect the service life of the mechanical components on which the loads are carried, and vibration, which adversely affects the comfort of the crew and passengers. In helicopters having tandem rotors, the control systems differentially tilt the rotors so that the thrust component of the lift vector has the magnitude and direction required to produce the hover yaw maneuver. The dynamic loads and vibrations produced during this maneuver are also large.

Conventional helicopter rotor systems have the rotor shaft fixed in position relative to the airframe. The controls and rotor change position relative to the airframe and rotor shaft when control system cyclic input is applied to change the direction of the thrust vector, the component of the rotor lift force that is directed parallel to the direction of forward flight.

Preferably rotor blade flapping, the related dynamic loads and vibration levels are reduced if the rotor shaft itself is permitted to pivot. If this were done, the size of the rotor hub and other dynamic components could be reduced and their service lives extended because lower rotor loads result.

In conventional rotor systems the inclination of the fixed rotor shaft is set at an angle that is satisfactory for hover and forward flight requirements, but the angle is not an optimum for both of these requirements. If the rotor shaft were free to pivot about mutually perpendicular axes, the fuselage of the aircraft would be disposed in relation to the direction of flight to lower the drag forces, which reduce forward speed and require greater power than is necessary if the fuselage were aligned with the direction of flight.

SUMMARY OF THE INVENTION

In realizing these objectives the transmission of a helicopter for use with this invention is rotated on a roll housing mounted on the airframe at a pivot that supports the roll housing for pivotal angular movement with respect to the roll axis. The roll housing carries another pivot, on which a pitch housing is supported for pivotal angular movement relative to the roll housing and airframe about the pitch axis. The transmission casing and the components of the gear drive system within the transmission are fixed to the upper surface of the pitch housing. The transmission output shaft and main rotor shaft extend upward from the casing to the rotor control and rotor hub, on which the rotor blades are supported.

Power from the engine is carried to the transmission by a sync shaft that carries an input pinion. The roll housing rotatably supports a lower ring gear for rotation about an axis perpendicular to the sync shaft axis. The pitch housing rotatably supports an upper ring gear for rotation about the axis of the output shaft and supports one or more side pinions for rotation about the pitch axis. The lower ring gear meshes with the input pinion and side pinions; and the upper ring gear meshes with the side pinions and carries a sun gear for a planetary gearset located within the casing;

A first speed reduction results between the sync shaft and the upper ring gear, and the planetary gearset produces another speed reduction between the upper ring and the output shaft.

Pitch and roll dampers restrain cyclic rotor tilting with respect to the airframe by throttling hydraulic fluid through orifices located within the dampers. A folded shroud seals the space between the roll housing and pitch housing, but permits unrestricted movement between the housings.

The attitude of the rotor shaft is determined by cyclic input forces applied by the rotor control system to the stationary ring.

DESCRIPTION OF THE PREFERRED EMBODIMENT

Figure 1:
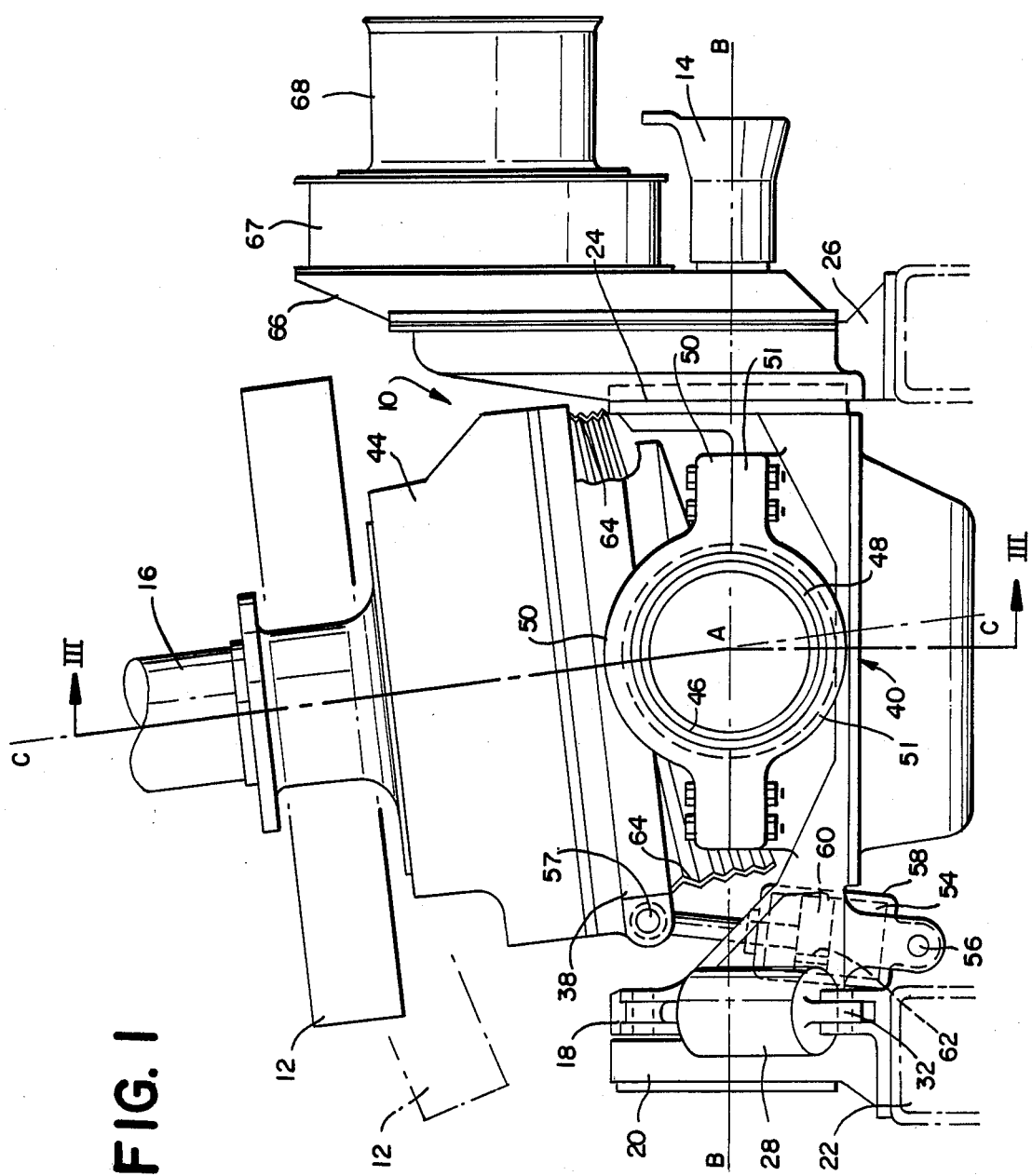
FIG. 1 is a side view of the power transmission mechanism of this invention viewed parallel to the pitch axis from the left side as it is located on a helicopter.
Figure 2:
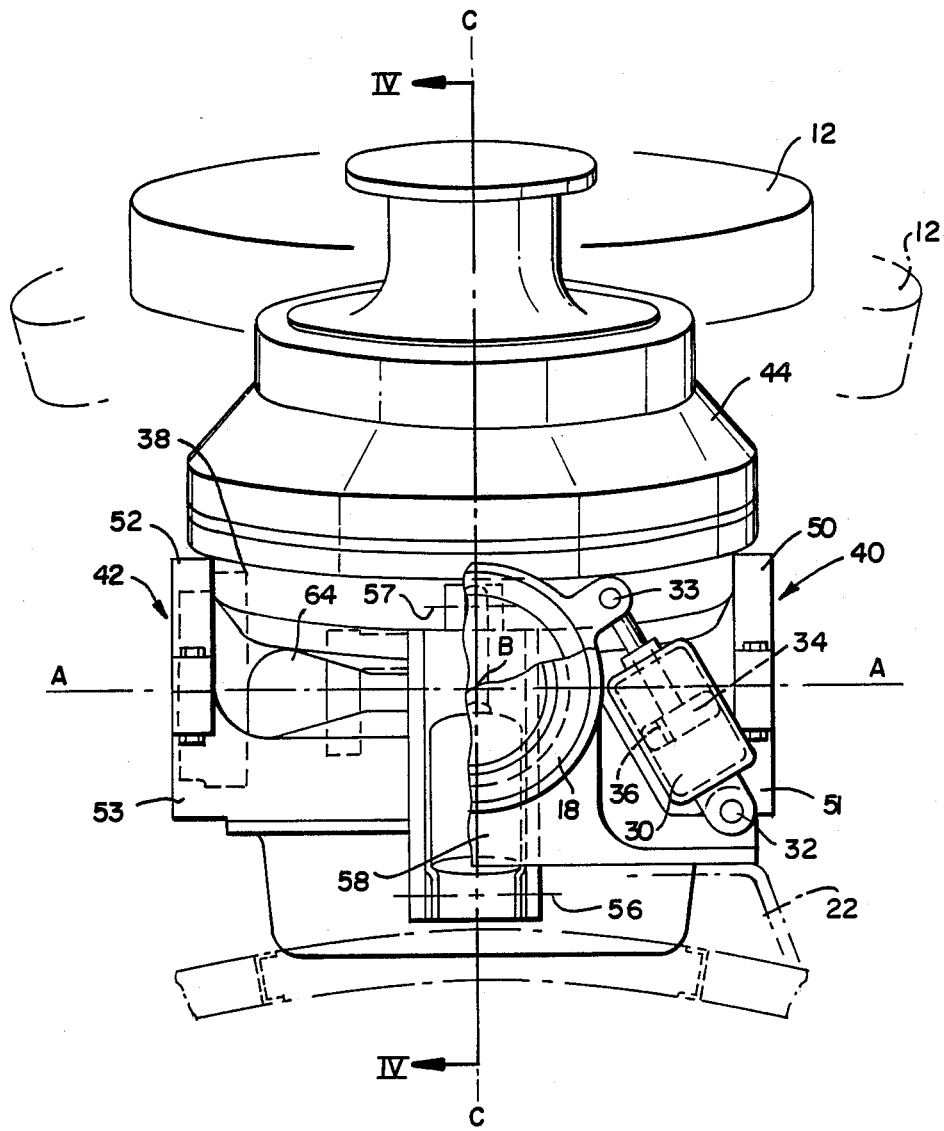
FIG. 2 is an elevation view of the mechanism of FIG. 1 viewed parallel to the roll axis from the front as it is located on a helicopter.

Referring first to FIGS. 1 and 2, the transmission 10 for a helicopter is located below the rotor swashplate 12, by which control forces are transmitted to the rotor and rotor blades. Power produced by the engines is combined in a combining transmission usually located outside the main transmission. In helicopters having tandem rotors, one located at the forward end of the aircraft and the other located at the aft end, the output from the combining transmission is carried by the forward and aft transmissions by a sync shaft 14, which drives the input pinions of the two transmissions at the same speed. The output shaft 16 passes through the swashplate and transmits torque through a spline connection to the rotor, on which are mounted the rotor blades.

The transmission and the structure for connecting it to the airframe permit the rotor shaft to pivot or tilt about the pitch axis A—A and roll axis B—B. A roll housing 18 is supported at the forward end of the transmission by a bearing mount 20 connected rigidly to the fuselage supporting structure 22 to permit pivotal movement about the roll axis. At the aft end of the transmission, the roll housing is supported pivotably by a bearing mount 24 connected rigidly to supporting fuselage structure 26 to permit rotation of housing 18 about the roll axis. Movement of the transmission, rotor, controls and rotor blades about the roll axis is restrained by a roll damper 28, located between roll housing 18 and the fuselage 22. Damper 28 includes a hydraulic cylinder 30 pinned to the fuselage to pivot about the pin 32 as housing 18 pivots, but is fixed against any displacement or rotation about an axis other than the roll axis. A piston 34, similarly pinned at 33 to housing 18, includes small holes 36 formed through the piston connecting the spaces of the cylinder that are separated by the piston. The cylinder is filled with hydraulic fluid. As housing 18 pivots, the fluid is pressurized within the cylinder as the piston moves with housing 18 relative to cylinder 32. The pressurized fluid throttles through the piston holes 36 into the unpressurized space of the cylinder and dissipates a portion of the dynamic energy of the pivoting mass of the rotor head, controls and transmission, thereby restraining roll pivoting or tilting.

A pitch housing 38 is supported at the left-hand side and right-hand side of the transmission by bearing mounts 40, 42 supported on the roll housing for pivotal movement about the pitch housing relative to the roll housing. The pitch housing supports the transmission upper cover 44, output shaft 18, swash plate 12, rotor, rotor blades, and upper and lower controls, all of which pivot on mounts 40, 42 about the pitch axis. The pitch housing includes rings 46, 47, one located at each bearing mount 40, 42 and on which the inner race of a pitch housing bearing 48, 49 is fitted. The outer race of bearing 48 contacts the inner surface of clamping rings 50-53, fixed to or formed integrally with roll housing 18 at each lateral side of housing 18. Movement of the masses that are supported is restrained by a roll damper 54 straddling the roll axis and connecting the pitch housing to rigid fuselage structure at connecting pin 56. Damper 54 includes a hydraulic cylinder 58, connected by the pin 56 to the fuselage, pivots as housing 38 pivots and is fixed against any displacement or rotation about any axis other than the pitch axis. A piston 60, similarly pinned at 57 to housing 38, includes small throttling holes 62 drilled through the piston connecting spaces of the cylinder separated by the piston. The cylinder is filled with hydraulic fluid. As housing 38 pivots, the fluid is pressurized in the cylinder 58 as piston 60 moves with housing 38 relative to cylinder 58. The fluid throttles through holes 62 into the unpressurized space of cylinder 58, thereby dissipating the dynamic energy of the mass that pivots about the pitch axis and restraining pitch tilting or pivoting.

A folded accordion shroud 64 encircles the space located between the lower outer edge of the pitch housing and the upper surface of the roll housing. The shroud flexes and expands as the housings pivot about their respective axes to provide an unobstructed sealed connection of the space bounded by the shroud. FIGS. 1–4 show in phantom lines the outline of the major components located at the extremities of the pivotal movement, which may be 17° counterclockwise and 4° clockwise about the pitch axis from the yaw axis C—C when viewed from the left-hand side of the aircraft and 15° of rotation about the roll axis in both direction from the yaw axis.

An accessory gear box 66 contains gearing driven from sync shaft 14 by which power is transmitted to various devices onboard the aircraft, such as motors for hydraulic pumps, electric generators, power units, etc. Gear box 66 contains a cooler 67 and a fan 68 to cool the transmission oil that circulates through the several bearings and onto the surfaces of the gear teeth and to dissipate heat to ambient air.

Figure 3:
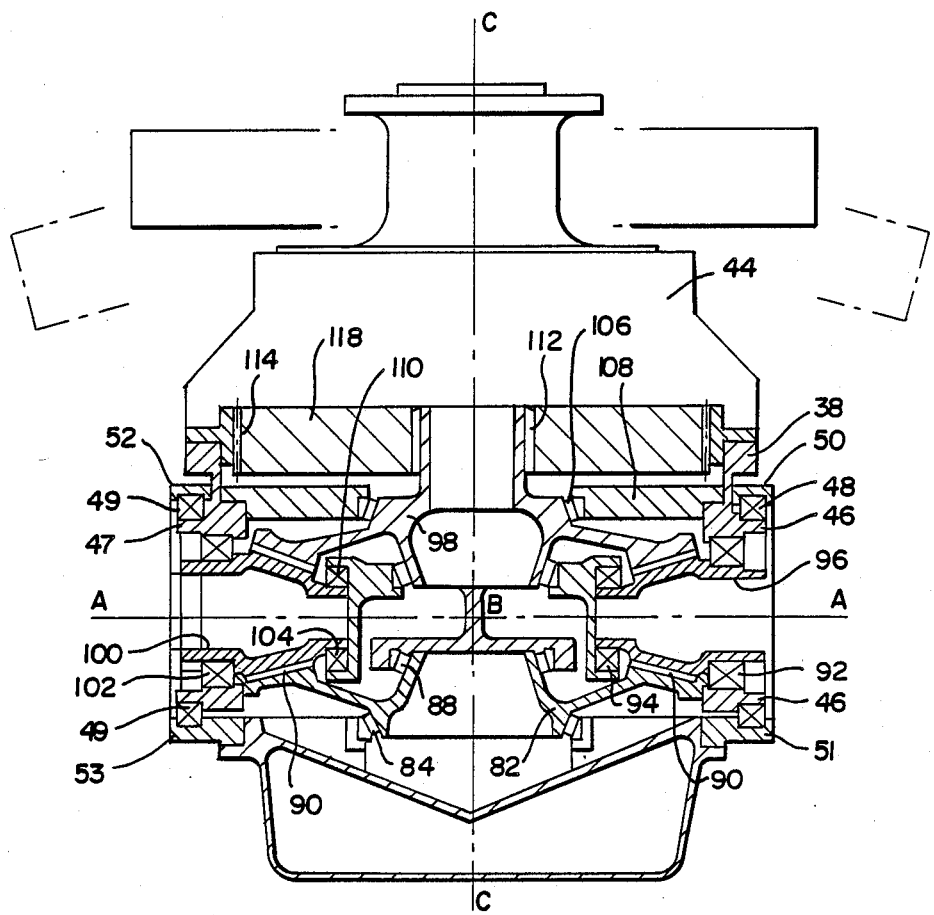
FIG. 3 is a cross section of FIG. 1 taken at plane III—III parallel to the pitch axis of the helicopter and viewed rearward.
Figure 4:
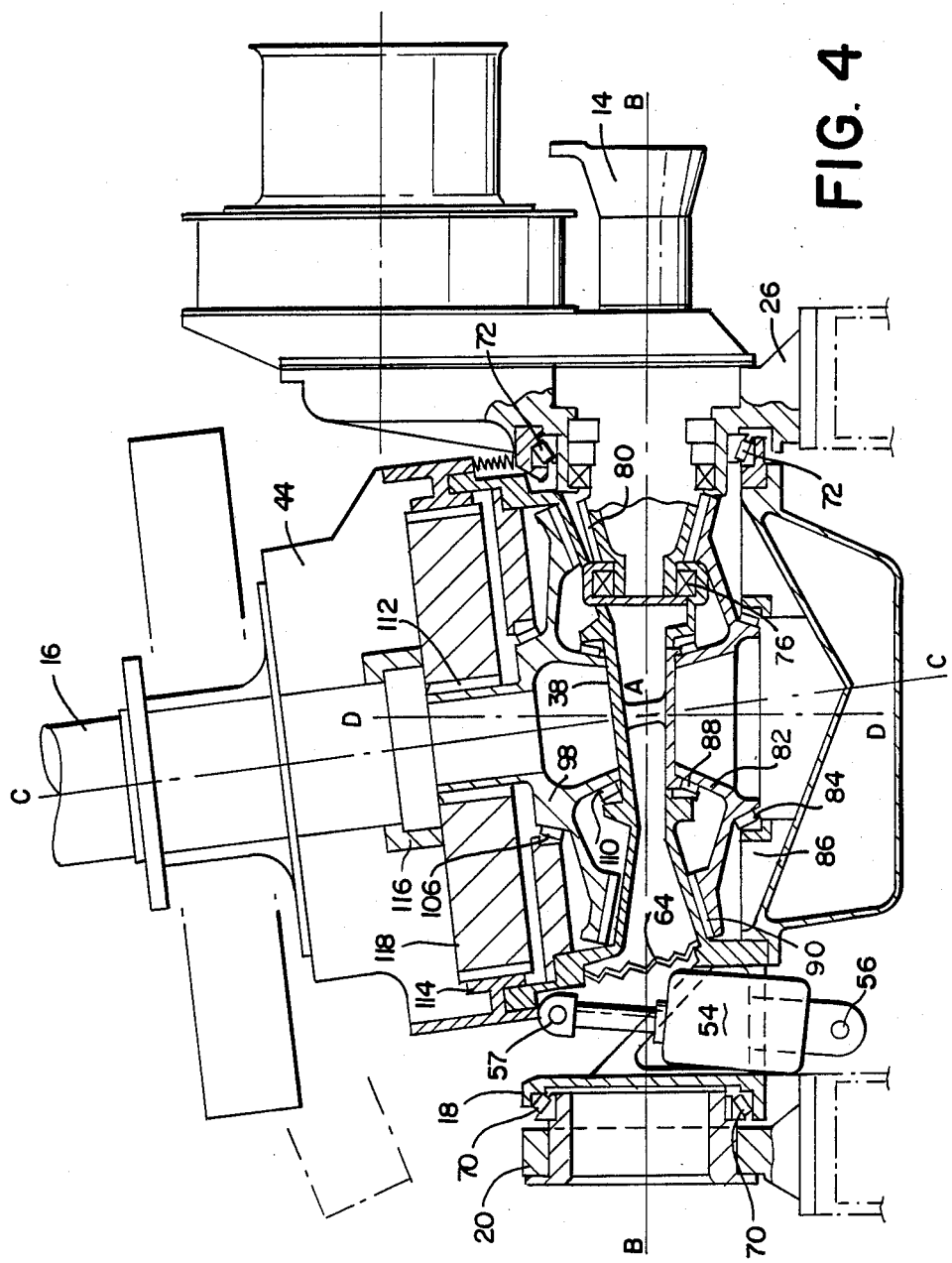
FIG. 4 is a cross section of FIG. 2 taken at plane IV—IV parallel to the longitudinal axis of the helicopter and viewed rightward.

Referring now to FIGS. 3 and 4, roll housing 18 is supported rotatably by bearings 70 on mount 20 at the forward end of the roll axis and by bearing 72 on accessory gear box 66, which is fixed by mount 20 to the fuselage. These bearings permit pivoting about the roll axis and transfer thrust force from housing 18 to mounts 20, 26.

Pitch housing 38 is supported pivotably by bearings 48, 49 located on opposite lateral sides of the plane that contains this pitch axis and yaw axis. Bearing 48 is located between ring 46 of the pitch housing and clamping rings 50, 51 on the roll housing. At the left-hand side, bearing 49 is located between ring 47 of the pitch housing and clamping rings 52, 53 on the roll housing. These bearings permit pivotal movement of the pitch axis and transfer thrust force between the housings.

Sync shaft 14, rotatably supported on bearing mount 26 by bearings 74 and by bearings 76 on the roll housing carries an input pinion 80, a bevel gear. A lower ring gear 82 is rotatably supported by bearings 84 on a portion of the transmission case 86 attached to roll housing 18 and by bearing 88 on the roll housing. Bearings 84 and 86 allow gear wheel 82 to rotate about a vertical axis D—D, which is free to pivot about roll axis B—B as the roll housing pivots. Ring gear 82 carries a bevel gear 90 in continuous meshing engagement with pinion 80. As housing 18 pivots gear wheel 82 pivots with it and the location of the roll mesh between pinion 80 and gear 90 rotates about the roll axis.

Supported rotatably on the pitch housing by bearing 92, 94 at the left-hand side of the plane that contains the yaw axis and roll axis is a first input bevel pinion 96 meeting continuously with gear 90 and bevel ring gear 98. A second input bevel pinion 100, supported rotatably on the pitch housing by bearings 102, 104 at the right-hand side of the roll axis, continuously meshes with upper bevel ring gear 98 and bevel gear 90 on the lower ring gear 82. Therefore as the pitch housing pivots about axis A—A, side bevel gears 96, 100, bevel ring gear 98 and the entire mass above and carried on the upper cover pivots about the pitch axis. These components also pivot about roll axis B—B because they ultimately are supported on roll housing 19 at bearings 70, 72.

Upper ring gear 98 is supported rotatably about axis C—C by bearing 106, which is carried on a radial support quill 108 carried on housing 38, and by bearing 110, located on the pitch housing. The upper ring gear carries a sun gear 112 for the first stage planetary gearset shown in FIG. 4. A stationary ring gear 114 cantilevered from the wall of casing 44 provides a reaction for the first stage planetary gearset. A planet carrier 116 rotatably supports a set of planet pinions 118, which mesh continuously on the sun gear 112 and stationary ring gear 114. The planet pinion may engage ring gear 114 directly, or it may engage sun gear 112 and a second set of planet pinion, which engages ring gear 114. In either case, the planet carrier rotates on ring gear 114 and is driven from gear 98. Carrier 116 may be arranged to drive a second sun gear used in combination with a second set of planetary pinion, which mesh with the second sun and with a second stationary ring gear fixed to upper casing 44. The secondary planetary gearset produces yet another reduction of speed between its input, the first carrier 116, and its output shaft 16, which is driven from the second carrier.

The lower ring gear 82 is driven by sync shaft 14 at a substantially reduced speed whose magnitude is proportional to the inverse ratio of the pitch diameters of pinion 80 and gear 90. Side bevel pinions 96 and 100 are driven by ring gear 82 substantially at the speed of the sync shaft. Upper ring gear 98 and its sun gear 112 are driven by side pinions 96 approximately at the speed of the lower ring gear. Therefore, a first speed reduction occurs between the sync shaft and the upper ring gear as torque is transmitted to a lower ring gear, the side bevel pinions and the upper ring gear. Thereafter, additional speed reductions result at the carrier of each planetary gearset and the speed of the output shaft 16 is slowed to approximately 200 rpm, through operation of the forward and aft transmissions.

The rotor control system includes a stationary ring whose attitude with respect to the rotor shaft is altered by a power servo and electromechanical actuator, which tilt the stationary ring about the pitch and roll axes. The rotating ring of a swashplate rotates in contact with the stationary ring and transmits collective pitch motion to the rotor blades through their connection to the rotating ring made by pitch links. Cyclic pitch input by the lower controls is transmitted by a scissors drive arm assembly from the rotating ring to the rotor.

We claim:

1. In a helicopter defining a roll axis, a pitch axis and a yaw axis and having a rigid airframe, a rotor mounted to the airframe, and a transmission mounted to the airframe for transmitting power to the rotor, the improvement comprising:
   roll support means including a fixed connection to the airframe and a first pivot means having its axis substantially aligned with the roll axis;
   a roll housing supported on the roll support means for pivotal rotation about the roll axis including a second pivot means having its axis substantially aligned with the pitch axis
   a pitch housing supported on the roll housing at the second pivot means for pivotal rotation about the pitch axis;
   roll damper means connecting the roll housing to the airframe for restraining pivotal rotation of the roll housing;
   pitch damper means connecting the pitch housing to the airframe for restraining pivotal rotation of the pitch housing;
   a lower ring gear rotatably supported on the roll housing having gear teeth adapted for engagement;
   a first side pinion in continuous meshing engagement with the lower ring gear;
   an upper ring gear rotatably supported on the pitch housing in continuous meshing engagement with the side pinion; and
   a second side pinion in continuous meshing engagement with the lower ring gear and the upper ring gear.

2. The device of claim 1 wherein the roll support means includes:
   a forward bearing mount located at the front of the transmission, fixed to the airframe, and carrying a bearing thereon having its axis directed substantially parallel to the roll axis; and
   an aft bearing mount located at the rear of the transmission, fixed to the airframe, and carrying a bearing thereon having its axis substantially aligned with the axis of the bearing carried on the forward bearing mount.

3. The device of claim 2 wherein the roll housing includes:
   a forward mounting ring supported on the bearing carried on the forward bearing mount; and
   an aft mounting ring supported on the bearing carried on the aft bearing mount.

4. The device of claim 1 wherein the roll housing includes bearing means for rotatably supporting the lower ring gear, and the lower ring gear includes gear teeth adapted to engage the first side pinion and to be engaged by a power input pinion.

5. The device of claim 1 wherein the roll housing further includes:
   a first pitch bearing mount located at the left-hand side of the transmission comprising clamping rings fixed to the roll housing and carrying a bearing therein having its axis directed substantially parallel to the pitch axis; and
   an second pitch bearing mount located at the right-hand side of the transmission comprising clamping rings fixed to the roll housing and carrying a bearing therein having its axis substantially aligned with the axis of the bearing carried in the first pitch bearing mount; and
   the pitch housing includes a first mounting ring supported on the bearing carried in the first pitch bearing mount, and a second mounting ring supported on the bearing carried in the second pitch bearing mount.

6. The device of claim 1 wherein the roll support means includes:
   a forward bearing mount located at the front of the transmission, fixed to the airframe, and carrying a bearing thereon having its axis directed substantially parallel to the roll axis; and
   an aft bearing mount located at the rear of the transmission, fixed to the airframe, and carrying a bearing thereon having its axis substantially aligned with the axis of the bearing carried on the forward bearing mount;
   the roll housing includes:
   a forward mounting ring supported on the bearing carried on the forward bearing mount;
   an aft mounting ring supported on the bearing carried on the aft bearing mount;
   a first pitch bearing mount located at the left-hand side of the transmission comprising clamping rings fixed to the roll housing and carrying a bearing therein having its axis directed substantially parallel to the pitch axis; and
   an second pitch bearing mount located at the right-hand side of the transmission comprising clamping rings fixed to the roll housing and carrying a bearing therein having its axis substantially aligned with the axis of the bearing carried in the first pitch bearing mount; and
   the pitch housing includes:
   a first mounting ring supported on the bearing carried in the first pitch bearing mount; and
   a second mounting ring supported on the bearing carried in the second pitch bearing mount.

7. The device of claim 6 wherein the roll housing includes bearing means for rotatably supporting the lower ring gear, and the lower ring gear includes gear teeth adapted to engage the first side pinion and to be engaged by a power input pinion.

8. The device of claim 1 wherein the pitch housing includes:
a first mounting ring supported on the bearing carried in the first pitch bearing mount, and a second mounting ring supported on the bearing carried in the second pitch bearing mount;
bearing means for rotatably supporting the upper ring gear, and the upper ring gear includes gear teeth adapted to engage the first side pinion.

9. The device of claim 8 wherein the pitch housing includes bearing means for rotatably supporting the first side pinion for rotation about the pitch axis and wherein the gear teeth of the upper ring gear are adapted to engage the first side pinion.

10. The device of claim 8 wherein the upper ring gear includes a sun gear adapted to engage a set of planet pinions and the transmission includes:
an upper transmission cover carried on the pitch housing and fixed against movement relative to the pitch housing;
an output shaft;
a planet pinion carrier driveably connected to the output shaft;
a set of planet pinions distributed angularly about the axis of the sun gear and engaged with the sun gear; and
a ring gear fixed to the upper transmission cover and having gear teeth engaged with the planet pinions.

11. The device of claim 6 wherein the upper ring gear includes a sun gear adapted to engage a set of planet pinions and the transmission includes:
an upper transmission cover carried on the pitch housing and fixed against movement relative to the pitch housing;
an output shaft;
a planet pinion carrier driveably connected to the output shaft;
a set of planet pinions distributed angularly about the axis of the sun gear and engaged with the sun gear; and
a ring gear fixed to the upper transmission cover and having gear teeth engaged with the planet pinions.

12. The device of claim 1 wherein the roll damper means includes:
a hydraulic cylinder;
a piston located within the cylinder, adapted to move axially relative to the cylinder and having a throttling orifice through which hydraulic fluid contained in the cylinder can pass, the, either the piston or the cylinder being fixed to the roll housing for movement therewith, the other of said cylinder or piston being fixed to the airframe for movement therewith, thereby restraining displacement of the roll housing relative to the airframe by damping.

13. The device of claim 1 wherein the pitch damper means includes:
a hydraulic cylinder;
a piston located within the cylinder, adapted to move axially relative to the cylinder and having a throttling orifice through which hydraulic fluid contained in the cylinder can pass, the, either the piston or the cylinder being fixed to the pitch housing for movement therewith, the other of said cylinder or piston being fixed to the airframe for movement therewith, thereby restraining displacement of the pitch housing relative to the airframe by damping.

14. The device of claim 8 wherein the pitch housing includes bearing means for rotatably supporting the first and second side pinions for rotation about the pitch axis and wherein the gear teeth of the upper ring gear are adapted to engage the first and second side pinions.

15. a device for supporting on a rigid airframe a helicopter transmission and rotor for pivotal movement about the pitch and roll axes, comprising:
roll support means including a fixed connection to the airframe and a first pivot means having its axis substantially aligned with the roll axis;
a roll housing supported on the roll support means for pivotal rotation about the roll axis including a second pivot means have its axis substantially aligned with the pitch axis, said first pivot means being adapted to extend on both sides of the pitch axis;
a pitch housing supported on the roll housing at the second pivot means for pivotal rotation about the pitch axis;
roll damper means connecting the roll housing to the airframe for restraining pivotal rotation of the roll housing; and
pitch damper means connecting the pith housing to the airframe for restraining pivotal rotation of the pitch housing.

16. The device of claim 14 wherein the roll support means includes:
a forward bearing mount located at the front of the transmission, fixed to the airframe, and carrying a bearing thereon having its axis directed substantially parallel to the roll axis; and
an aft bearing mount located at the rear of the transmission, fixed to the airframe, and carrying a bearing thereon having its axis substantially aligned with the axis of the bearing carried on the forward bearing mount.

17. The device of claim 16 wherein the roll housing includes:
a forward mounting ring supported on the bearing carried on the forward bearing mount; and
an aft mounting ring supported on the bearing carried on the aft bearing mount.

18. The device of claim 15 wherein the roll housing further includes:
a first pitch bearing mount located at the left-hand side of the transmission comprising clamping rings fixed to the roll housing and carrying a bearing therein having its axis directed substantially parallel to the pitch axis; and
an second pitch bearing mount located at the right-hand side of the transmission comprising clamping rings fixed to the roll housing and carrying a bearing therein having its axis substantially aligned with the axis of the bearing carried in the first pitch bearing mount; and
the pitch housing includes a first mounting ring supported on the bearing carried in the first pitch bearing mount, and a second mounting ring supported on the bearing carried in the second pitch bearing mount.

19. The device of claim 15 wherein the roll support means includes:
a forward bearing mount located at the front of the transmission, fixed to the airframe, and carrying a bearing thereon having its axis directed substantially parallel to the roll axis; and
an aft bearing mount located at the rear of the transmission, fixed to the airframe, and carrying a bearing thereon having its axis substantially aligned with the axis of the bearing carried on the forward bearing mount;

the roll housing includes:

a forward mounting ring supported on the bearing carried on the forward bearing mount;

an aft mounting ring supported on the bearing carried on the aft bearing mount;

a first pitch bearing mount located at the left-hand side of the transmission comprising clamping rings fixed to the roll housing and carrying a bearing therein having its axis directed substantially parallel to the pitch axis; and an second pitch bearing mount located at the right-hand side of the transmission comprising clamping rings fixed to the roll housing and carrying a bearing therein having its axis substantially aligned with the axis of the bearing carried in the first pitch bearing mount; and the pitch housing includes:

a first mounting ring supported on the bearing carried in the first pitch bearing mount; and a second mounting ring supported on the bearing carried in the second pitch bearing mount.

20. The device of claim 18 wherein the pitch housing includes bearing means for rotatably supporting a first side pinion for rotation about the pitch axis.

21. The device of claim 15 wherein the roll damper means includes:

a hydraulic cylinder;

a piston located within the cylinder, adapted to move axially relative to the cylinder and having a throttling orifice through which hydraulic fluid contained in the cylinder can pass, the, either the piston or the cylinder being fixed to the roll housing for movement therewith, the other of said cylinder or piston being fixed to the airframe for movement therewith, thereby restraining displacement of the roll housing relative to the airframe by damping.

22. The device of claim 15 wherein the pitch damper means includes:

a hydraulic cylinder;

a piston located within the cylinder, adapted to move axially relative to the cylinder and having a throttling orifice through which hydraulic fluid contained in the cylinder can pass, the, either the piston or the cylinder being fixed to the pitch housing for movement therewith, the other of said cylinder or piston being fixed to the airframe for movement therewith, thereby restraining displacement of the pitch housing relative to the airframe by damping.

23. The device of claim 22 wherein the pitch housing includes bearing means for rotatably supporting first and second side pinions for rotation about the pitch axis.

24. A device for supporting on a rigid airframe a helicopter transmission and rotor for pivotal movement about the pitch and roll axes, comprising:

first pivot means having its axis substantially aligned with the roll axis;

roll support means fixedly connected to the airframe and the first pivot means, said roll support means including: a forward bearing mount located at the front of the transmission, fixed to the airframe and carrying a bearing thereon having its axis directed substantially parallel to the roll axis; and an aft bearing mount located at the rear of the transmission, fixed to the airframe, and carrying a bearing thereon having its axis substantially aligned with the axis of the bearing carried on the forward bearing mount;

a roll housing supported on the roll support means for pivotal rotation about the roll axis including a second pivot means having its axis substantially aligned with the pitch axis, said roll housing including: a forward mounting ring supported on the bearing carried on the forward bearing mount; an aft mounting ring supported on the bearing carried on the aft bearing mount; a first pitch bearing mount located at the left-hand side of the transmission comprising clamping rings fixed to the roll housing and carrying a bearing therein having its axis directed substantially parallel to the pitch axis; a second pitch bearing mount located at the right-hand side of the transmission comprising clamping rings fixed to the roll housing and carrying a bearing therein having its axis substantially aligned with the axis of the bearing carried in the first pitch bearing mount; and bearing means for rotatably supporting a lower ring gear;

a pitch housing supported on the roll housing at the second pivot means for pivotal rotation about the pitch axis, said pitch housing including: a first mounting ring supported on the bearing carried in the first pitch bearing mount; and a second mounting ring supported on the bearing carried in the second pitch bearing mount;

roll damper means connecting the roll housing to the airframe for restraining pivotal rotation of the roll housing; and pitch damper means connecting the pitch housing to the airframe for restraining pivotal rotation of the pitch housing 25. A device for supporting on a rigid airframe a helicopter transmission and rotor for pivotal movement about the pitch and roll axes, comprising:

first pivot means having its axis substantially aligned with the roll axis;

roll support means fixedly connected to the airframe and the first pivot means;

a roll housing supported on the roll support means for pivotal rotation about the roll axis including a second pivot means having its axis substantially aligned with the pitch axis;

a pitch housing supported on the roll housing at the second pivot means for pivotal rotation about the pitch axis, said pitch housing including: a first mounting ring supported on the bearing carried in the first pitch bearing mount; a second mounting ring supported on the bearing carried in the second pitch bearing mount; and bearing means for rotatably supporting an upper bearing mount;

roll damper means connecting the roll housing to the airframe for restraining pivotal rotation of the roll housing; and pitch damper means connecting the pitch housing to the airframe for restraining pivotal rotation of the pitch housing.

* * * * *